United States Patent [19]

Claussen et al.

[11] Patent Number: 4,525,464

[45] Date of Patent: Jun. 25, 1985

[54] CERAMIC BODY OF ZIRCONIUM DIOXIDE ($ZrO_2$) AND METHOD FOR ITS PREPARATION

[75] Inventors: Nils Claussen, Leonberg; Manfred Rühle, Ditzingen; Günter Petzow, Leinfelden-Echterdingen, all of Fed. Rep. of Germany

[73] Assignee: Max-Planck-Gesellschaft zur Förderung der Wissenschaften, Gottingen, Fed. Rep. of Germany

[21] Appl. No.: 619,939

[22] Filed: Jun. 12, 1984

[51] Int. Cl.³ .................... C04B 35/48; C04B 35/50
[52] U.S. Cl. .................... 501/103; 264/60; 501/104; 501/105; 501/152
[58] Field of Search .................... 264/60; 501/103, 104, 501/105, 152

[56] References Cited

U.S. PATENT DOCUMENTS

| | | | |
|---|---|---|---|
| 4,067,745 | 1/1978 | Garvie et al. | 501/104 |
| 4,298,385 | 11/1981 | Claussen et al. | 264/60 |
| 4,322,249 | 3/1982 | Claussen et al. | 501/105 |
| 4,419,311 | 12/1983 | Claussen et al. | 264/60 |
| 4,421,861 | 12/1983 | Claussen et al. | 501/103 |

*Primary Examiner*—Helen M. McCarthy
*Attorney, Agent, or Firm*—Felfe & Lynch

[57] ABSTRACT

A ceramic body of zirconium dioxide containing, if desired, aluminum oxide, and partially stabilized with yttrium oxide and/or one or more rare earth oxides (e.g., cerium dioxide) and/or magnesium oxide and/or calcium oxide is partially stabilized with 0.5 to 5 mole-% of yttrium oxide and/or 5 to 12 mole-% of magnesium oxide and/or calcium oxide and/or cerium dioxide or one or more rare earth oxides, is 30 to 100% in the tetragonal lattice modification and has in the surface region a content of yttrium oxide, cerium dioxide, magnesium oxide, calcium oxide or rare earth oxide that is 1 to 20 mole-% higher than the average content, such that the body is coated with a thin, PSZ-like layer in a more highly stabilized tetragonal or with a layer that is predominantly in the cubic lattice form. For preparation, the surface of an already sintered or only presolidified compact of partially stabilized zirconium oxide is brought into intimate contact with yttrium oxide, cerium dioxide, magnesium oxide, calcium oxide and/or another rare earth powder or a zirconium dioxide powder containing at least 12 mole-% of yttrium oxide and/or other stabilizer oxides, and then annealed at 1000° to 1600° C. until a more highly stabilized tetragonal or predominantly cubic surface layer of 0.1 to 200 micrometers thickness and 2 to 20 mole-% higher content of yttrium oxide, cerium dioxide, magnesium oxide, calcium oxide or rare earth oxide has formed.

13 Claims, No Drawings

CERAMIC BODY OF ZIRCONIUM DIOXIDE (ZrO$_2$) AND METHOD FOR ITS PREPARATION

Finely granular zirconium dioxide bodies partially stabilized with yttrium oxide, cerium dioxide and/or other rare earth oxides, and coarsely granular zirconium dioxide bodies partially stabilized with magnesium oxide or calcium oxide pertain to the polycrystalline ceramics which have the highest strengths and resistance to fracture which have been measured up to now. The chief reason for this lies in the tension-induced transformation of the tetragonal lattice modification to the monoclinic room-temperature modification. For example, bodies containing yttrium oxide are sintered, hot-pressed or hot-isostatically pressed ("hipped") usually with an yttrium oxide content between 1 and 6 mole-%, either in the tetragonal monophasic field or in the cubic/tetragonal two-phase region, at temperatures between 1400° and 1550° C. Their structure then consists of a fine-grained (0.1-1.0 micrometer), tetragonal content (up to 100%) and somewhat coarser, cubic grains (1-10 micrometers) (3.5-6.0 mole-% for high yttrium oxide contents). To increase the hardness and modulus of elasticity the bodies can contain aluminum oxide in larger amounts.

Zirconium oxide bodies containing magnesium oxide or calcium oxide are usually sintered in the cubic monophasic region at temperatures between 1690° and 1800° C.; they are therefore more coarse-grained (50 to 70 micrometers).

The decisive disadvantage of these super-strong ceramic bodies, especially those containing yttrium oxide, is that they lose their strength drastically after relatively long heat treatment at temperatures between 200° and 550° in air; this loss of strength is greatly accelerated with increasing atmospheric humidity or high steam pressure (O. T. Masaki, K. Kobayashi, Proc. Ann. Meeting Jap. Ceram. Soc. 1981). Even in warm, aqueous solutions, degradation of the bodies can occur. The reason for this is not yet understood. It is assumed, however, that the mechanical tensions of the tetragonal bodies are removed by tension crack corrosion at the grain boundaries, and thus a transformation to the monoclinic form occurs, or that other diffusion-controlled mechanisms cause martensite nuclei to form at the surface and thus initiate the transformation that ultimately results in the destruction of the bodies.

This decisive disadvantage makes the new class of the so-called TZP ceramics (TZP: Tetragonal Zirconia Polycrystals. A bibliography on TZP ceramics is contained in the book, "Science and Technology of Zirconia II", Advances in Ceramics, Vol. 11, 1984) suitable for use in air only for application temperatures up to about 200° C., although such ceramics would offer substantial advantages for use in internal combustion engines. This phenomenon would also be disadvantageous for use as a bioceramic (hip joint replacement).

Conventional zirconium dioxide ceramics partially stabilized with magnesium oxide (Mg-PSZ), when exposed to heat for long periods at somewhat higher temperatures (700° to 1000° C., have a similar disadvantage. On account of the rapid diffusion or vaporization rate of magnesium oxide, surface degradation occurs, especially in a slightly reducing atmosphere.

Surprisingly, it has now been found—and the invention is based on it—that in sintered specimens which have been heat treated in a milieu rich in yttrium oxide, cerium oxide, magnesium oxide or calcium oxide, e.g., a powder bed of yttrium oxide or magnesium oxide, this degradation process does not occur, or occurs to a lesser degree.

The invention is therefore based on the problem of reducing or eliminating the above-described loss of strength or surface degradation in ceramic bodies of zirconium dioxide.

The problem is solved by a ceramic body partially stabilized with yttrium oxide and/or cerium oxide and/or one or more rare earth oxides and/or magnesium oxide and possibly containing aluminum oxide, which is characterized by being partially stabilized with 0.5 to 5 mole-% of yttrium oxide and/or 2 to 12 mole-% of magnesium oxide and/or calcium oxide and one or more rare earth oxides (e.g., cerium oxide), is 30 to 100% in the tetragonal lattice modification, and has in the surface region a content of yttrium oxide or rare earth oxide and/or magnesium oxide and/or calcium oxide, such that the body is covered by a thin layer that is mostly in the cubic lattice form or in a more highly stabilized tetragonal lattice form. It is obvious that a partially stabilized cubic layer can be transformed by tempering (peak aging) at temperatures commonly used in PSZ (1100°-1420° C.) to a PSZ-like layer (i.e., cubic grains having tetragonal segregations).

The term, "thin surface layer," in the sense of the invention, is to be understood to mean a layer with a thickness of 0.1 to 200 micrometers, preferably 0.3 to 30 micrometers. The body on the basis of zirconium dioxide in accordance with the invention is prepared by firing it in a milieu which is rich in yttrium oxide, cerium oxide, magnesium oxide, calcium oxide and/or rare earth oxides. The invention is explained hereinbelow on the basis of the use of yttrium oxide, cerium oxide, magnesium oxide and calcium oxide. It is to be understood, however, that it applies likewise to other rare earth oxides. This surface stabilization or annealing is likewise advantageous for conventional zirconia ceramics partially stabilized with magnesium oxide or calcium oxide.

To prepare the ceramic body in accordance with the invention, it is possible to set out either from the finished sintered or hipped ceramic or from a green body presolidified at relatively low temperature (e.g., room temperature). The ceramic or the green body is now provided with a surface of yttrium oxide, cerium oxide, magnesium oxide, calcium oxide, etc., either in the form of a pressed-on layer of powder or of a slip containing yttrium oxide or magnesium oxide, which can be sprayed on, for example, or applied in the form of a bath for impregnating the surface. The bodies thus treated are then fired or sintered at temperatures between 1000° and 1600° C., the length of the treatment being able to be between about 10 minutes and about 100 hours. The desired surface stabilization is also achieved to special advantage by firing or sintering the ceramic or green body in a powder bed of yttrium oxide and/or cerium oxide and/or magnesium oxide and/or calcium oxide. Those conditions are preferred in which the desired diffusion is achieved in the shortest possible time, while at the same time achieving a PSZ-like layer.

For the preparation of the ceramic body itself, the body can be performed either by mixing the oxides, or by wet chemical methods such as sol gel, coprecipitation, spray reaction of aqueous solutions, or from fine, homogeneous powders obtained by fusion and prealloyed with yttrium oxide, cerium oxide, magnesium oxide and/or calcium oxide, and then sintering or hipping, or sintered and then hipped, at temperatures generally between 1350° and 1550° C. The finished ceramic is then, as mentioned above, coated with yttrium oxide, cerium oxide, magnesium oxide, calcium oxide, etc., or fired in a corresponding powder bed, until the surface layer enriched with yttrium, cerium, magnesium, or calcium oxide etc. is formed.

When a stabilizer-rich coating is applied to a green body, the body is commonly preformed at a low pressure, say of about 100 MPa, and then pressed again at higher pressure, e.g., 200 to 650 MPa. In most cases, however, the preferred method is the sintering of the pressed body or the firing of a finish-sintered and processed body in a powder bed containing magnesium oxide or yttrium oxide and/or cerium oxide.

The ceramic bodies of the invention, in comparison to specimens prepared under otherwise equal conditions but without the above-described surface treatment, in a treatment for accelerated aging, consisting of four hours of firing at temperatures between 250° C. and 400° C. at steam pressures of 4 to 15 bar, show scarcely any effect.

In X-ray examination, in the case of the ceramic bodies of the invention, only the cubic and tetragonal reflections of the body subjected to the accelerated aging are detectable after this treatment, while the specimens used for comparison show strong monoclinic reflections which are an indication of incipient degradation. The best results were obtained when the thin surface layer was produced by firing the ready-sintered samples in magnesium oxide, yttrium oxide, cerium oxide or calcium oxide powder, or by treatment with yttrium oxide powder or a zirconium powder containing at least 12 mole-% of yttrium oxide, the surface layer being pressed onto the zirconium oxide compacts stabilized by a small addition (0.5 to 5, preferably 2 to 4 mole-%) of yttrium oxide, or being applied as an aqueous suspension of powder and sintered. But, no matter how the surface layer is produced, an important condition for the achievement of the protective action of the stabilizer-containing coating is very close contact with the surface of the zirconium oxide specimen to be heated or sintered.

The thin, generally 0.5 to 30 micrometers deep, stabilizer-rich zirconium oxide surface layer which is formed by the treatment of the invention, appears to constitute a protection against long-term thermal disintegration. This layer can also contain aluminum oxide for fining the grain. Presumably other rare earth oxides produce a similarly positive effect, as previously mentioned. On account of the extremely slow diffusion of yttrium oxide into zirconium oxide at temperatures below 1000° C., this layer represents primarily a thermally stable protection for TZP ceramics, but also for conventional zirconium oxide partially stabilized with magnesium or calcium (Mg-, Ca-PSZ).

The following examples further explain the invention.

EXAMPLE 1

Samples of reaction-sprayed powders (EDS powders: Evaporation Decomposition of Solutions, Am. Ceram. Soc. Bull. 50 (1977) 1023) which contained 2 mole-% of yttrium oxide and 1.5 vol.-% of aluminum oxide, and had been ground for 4 hours in water in an attrition mill with alumina balls containing silica and spray dried, were isostatically pressed at 630 MPa and sintered in air for 2 hours at 1450° C. The X-ray reflections thereafter indicated a predominantly tetragonal structure (grain size approx. 0.4 micrometers). Flexural test samples indicate, in the polished surface state, a strength of 920 MPa (type I) and, after 36 h of firing at 1350° C. in an yttria powder bed, a strength of 810 MPa (type II). After all of the samples were cooked in the autoclave at 400° C. for 4 hours at 4 bar steam pressure, the strength of type I was only 420 MPa, while type II showed a strength of 740 MPa.

EXAMPLE 2

Samples of a powder which was prepared and treated as in Example 1, but contained only 2 mole-% of yttrium oxide by volume, were formed as in Example 1. An aqueous suspension of yttria powder was applied to the cylindrical compacts and some of it penetrated into the surface pores; then the coated compacts (type I) were sintered at 1500° C. for 2 hours, and then subjected to the autoclaving described in Example 1, together with identical samples with no coating (type II). After this treatment, type I showed only tetragonal and cubic X-ray reflections, but type II showed tetragonal and large monoclinic X-ray reflections which indicates the thermal degradation of the uncoated samples.

EXAMPLE 3

Samples from the powder of Example 1 were isostatically pressed at a pressure of 100 MPa, and then sprayed with a suspension of 12 mole-% zirconia powder containing 12 mole-% of yttrium oxide (coating thickness approx. 40 to 200 micrometers), then pressed again isostatically at 630 MPa, and sintered as in Example 1. After the autoclaving treatment (as in Example 1), no thermal degradation of the surface could be detected.

EXAMPLE 4

Samples in accordance with Example 2 were coated with the same suspension, but this time with the addition of 20% alumina by volume, and otherwise treated as in Example 1. Here, again, no degradation could be detected after the heat treatment in the autoclave.

EXAMPLE 5

50 volume-percent of alumina powder (Pechinee Ugine Kuhlman, A6) [was added]to the powder from Example 1 and ground in the attrition mill as in Example 1. Isostatically pressed cylinders (approx. 1×1 cm diameter) were sintered at 1500° C., some with (type I) and some without (type II) a slip of 50 wt.-% of yttrium oxide and 50 wt.-% of cerium oxide. Then type I contained on the polished surface only tetragonal zirconium oxide plus aluminum oxide (measured by X-ray analysis), while type II additionally contained cubic forms. After autoclaving as in Example 8, with only 8 bar of steam pressure, the surface of type I had a high content of monoclinic zirconium oxide, while type II showed no measurable change.

EXAMPLE 6

A coprecipitated zirconia powder containing 2.2 mole-% of yttrium oxide was pressed isostatically at 620 MPa; the samples were then sintered in air for 2 hours at 1500° C. The bodies thus prepared contained exclusively tetragonal grains of an average size of 0.4 micrometers (material type A). A similarly made commercial material with 3 mole-% of yttrium oxide contained approximate 80% of tetragonal grains (approximately 0.4 micrometers) and approximately 20% cubic grains (about 5 micrometers) (material type B).

Material types A and B were subjected to an autoclave test with a steam pressure of 5 bar at 250° C. for 2 hours, and both types degrade greatly, i.e., show mostly monoclinic reflections at the surface; type A was even completely decomposed.

Types A and B were then fired each for 2 hours in powder beds of yttrium oxide, cerium oxide, titanium oxide, magnesium oxide and calcium oxide, at different temperatures. The heat treatment temperatures and the results of the autoclave test that followed are listed in Table 1. From this it appears that, with the exception of titanium oxide, all the other oxides have a positive effect, especially at higher temperatures. A firing in a magnesium oxide powder bed is effective even at relatively low temperatures (1120° C.).

Types A and B, in the form of unsintered compacts, were sintered for 2 h at 1500° C. in powder beds of yttrium oxide, cerium oxide, calcium oxide and magnesium oxide (in air). The above-described autoclave test again showed no surface degradation.

TABLE 1

Sintering in a powder bed, followed by autoclave test for 2 hours, 5 bar steam pressure, 250° C.

| Sintering tempera- ture °C. | Powder bed | | | | | | | | | |
|---|---|---|---|---|---|---|---|---|---|---|
| | Yttrium oxide | | Cerium oxide | | Titanium oxide | | Magnesium oxide | | Calcium oxide | |
| | Type of Material | | | | | | | | | |
| | A | B | A | B | A | B | A | B | A | B |
| 1120 | − | − | − | − | − | − | − | − | − | o |
| 1220 | − | o | o | o | − | − | − | o | + | + |
| 1320 | o | + | o | + | − | − | + | + | + | + |
| 1420 | + | + | + | + | − | o | + | + | + | + |

EXAMPLE 7

A conventional zirconia partially stabilized with magnesia (Mg-PSZ), containing 3.3 wt.-% of magnesium oxide, was subjected to a solution anneal in air at 1700° C. for 2 hours, followed by rapid cooling to room temperature, and was then subjected to two hours of sintering at 1420° C. in yttria powder. While the monoclinic content at the surface in the untreated (as-received) sample increased, after 100 hours in a slightly reducing atmosphere at 920° C., from originally 15% to 32%, the monoclinic content in the sample sintered in yttria was below the measurable range, i.e., less than 4%.

We claim:

1. In a ceramic body of zirconium dioxide or zirconium dioxide containing aluminum oxide, the improvement comprising said ceramic body
   being partially stabilized with 0.5 to 5 mole-% of yttrium oxide, 5 to 15 mole-% magnesium oxide, calcium oxide, 5 to 15 mole-% cerium oxide, 5 to 15 mole-% of one or more rare earth dioxides or 5 to 15 mole-% of a combination thereof;
   being 30 to 100% in the tetragonal lattice modification; and
   having, in the surface region, a content of yttrium oxide, cerium dioxide, magnesium oxide, calcium oxide or rare earth oxide that is 2 to 20 mole-% higher than the average content in said ceramic body, such that the body is covered with a thin layer of a more highly stabilized tetragonal lattice form or one predominantly in the cubic lattice form.

2. The ceramic body of claim 1 partially stabilized with 0.5 to 5 mole-% yttrium oxide and having a content of 2 to 20 mole % higher than the average, of yttrium oxide in the surface region thereof.

3. A method for the preparation of a ceramic body which is partially stabilized with 0.5 to 5 mole-% of yttrium oxide, 5 to 15 mole-% of magnesium oxide, calcium oxide and/or cerium oxide or one or more rare earth dioxides; is 30 to 100% in the tetragonal lattice modification; and has in the surface region a content of yttrium oxide, cerium dioxide, magnesium oxide, calcium oxide or rare earth oxide that is 2 to 20 mole-% higher than the average content, such that the body is covered with a thin layer of a more highly stabilized tetragonal lattice form of one predominantly in the cubic lattice form, comprising the steps of
   placing the surface of an already sintered or only presolidified compact of partially stabilized zirconium dioxide in intimate contact with yttrium oxide, cerium dioxide, magnesium oxide, calcium oxide and/or other rare earth oxide powder, or a zirconium dioxide powder containing at least 12 mole-% yttrium oxide and/or other stabilizer oxides, and then
   annealing said sintered or presolidified compact at 1000° to 1600° C., to form a more highly stabilized tetragonal or mainly cubic surface layer of 0.1 to 200 micrometers thickness having a 2 to 20 mole-% higher content of yttrium oxide, cerium dioxide, magnesium oxide, calcium oxide or rare earth oxide than the average content in the ceramic body.

4. The method of claim 3, wherein the surface contact with yttrium oxide, cerium dioxide, magnesium oxide, calcium oxide or rare earth oxide comprises placing the ceramic body in a powder bed, spraying or pressing a powder layer onto the ceramic body or treating the ceramic body with a suspension of the powder.

5. The method of claim 3 wherein the ceramic body is a body sintered at 1350° to 1550° C. and/or hot-isostatically pressed and is formed of partially stabilized zirconium dioxide.

6. The method of claim 3 wherein the ceramic body is an unsintered compact of partially stabilized zirconium dioxide, and is sintered at 1350° to 1550° C.

7. The method of claim 3 wherein the ceramic body is a zirconium dioxide body, partially stabilized with 7 to 11 mole-% of magnesium oxide, sintered at temperatures between 1690° and 1800° C., and thereafter annealed at temperatures between 1350° and 1550° C. in contact with yttrium oxide and/or cerium oxide and/or other rare earth oxide powders for 1 to 5 hours.

8. The method of claim 3 wherein the ceramic body is a sintered compact or green body containing 2 to 4 mole-% of yttrium oxide or rare earth oxide as stabilizer.

9. The method of claim 4 wherein the ceramic body is sintered at 1350° to 1550° C. and/or hot-isostatically pressed and is formed of partially stabilized zirconium dioxide.

10. The method of claim 4 wherein the ceramic body is unsintered compact of partially stabilized zirconium dioxide, sintered at 1350° to 1550° C.

11. The method of claim 4 wherein the ceramic body is a zirconium dioxide body, partially stabilized with 7 to 11 mole-% of magnesium oxide, sintered at temperatures between 1690° and 1800° C., and thereafter annealed at temperatures between 1350° and 1550° C. in contact with yttrium oxide and/or cerium oxide and/or other rare earth oxide powders for 1 to 5 hours.

12. The method of claim 11 wherein yttrium oxide, cerium oxide or a combination thereof, is used.

13. The method of claim 4 wherein the ceramic body is a sintered compact or green body containing 2 to 4 mole-% of yttrium oxide or rare earth oxide as stabilizer.

* * * * *